March 3, 1953     N. SHARAF     2,630,061
COFFEE MAKER

Filed April 5, 1947     2 SHEETS—SHEET 1

INVENTOR.
NATHAN SHARAF
BY
his ATTORNEY

March 3, 1953  N. SHARAF  2,630,061
COFFEE MAKER

Filed April 5, 1947  2 SHEETS—SHEET 2

INVENTOR.
NATHAN SHARAF
BY
his  *[signature]*
ATTORNEY

Patented Mar. 3, 1953

2,630,061

UNITED STATES PATENT OFFICE 2,630,061

COFFEE MAKER

Nathan Sharaf, Brookline, Mass.

Application April 5, 1947, Serial No. 739,683

4 Claims. (Cl. 99—291)

The present invention relates to coffee makers—i. e., devices used to prepare the beverage from the ground coffee. The present invention is shown as applied to the percolator type used quite generally in restaurants and hotels, in which boiling water is poured over the ground coffee contained in the porous coffee bag or ring, so-called, retained in the top of the container.

It has long been recognized that in order to obtain repeatedly the same coffee brew from a given kind of ground coffee, conditions in the preparation of the brew must be accurately repeated without variation. Among the things which are important in the preparation of coffee is maintaining the proper proportions of the boiling water and the coffee as may have been established by trial or testing. For this reason, it is common practice for the operators to measure out the water in gallon containers, and it is then dumped or poured over the coffee in the coffee bag or ring at the top of the container or urn. This is objectionable for a number of reasons. In the first place, the volume of the water is not accurately measured. There is danger that the operator may scald himself in pouring the water, as the top of the percolator is considerably higher than the bottom and the water, which is heavy, must be lifted higher than the top before it can be poured. Another objection is that usually the operator simply dumps the water over the coffee and it is therefore not poured constantly and slowly through the coffee grounds. It also takes some time for the gallon container or pitcher to fill and since it stands exposed and unheated, the boiling water cools before it actually diffuses in the coffee. A further objection is that usually two or three pitchers full of boiling water are necessary in making the required amount of brew for the coffee urn.

These factors of uncertainty, inaccuracy, danger, and difficulty are all avoided in the system of the present invention, in which a measured volume of boiling water is automatically provided and the apparatus is connected in such a manner that the water can be readily spilled without effort on the part of the operator or allowed to trickle or spray over the coffee in the coffee bag in a uniform and consistent fashion. Water temperatures can be carefully preserved and observed. The coffee may be made without recirculation through the coffee bag unless particularly desired. The present system is such that the ordinary volume of coffee may be made so quickly and conveniently that smaller coffee units may be provided, with the result that the coffee may be prepared more often and therefore be fresh all the time. The operator does not need to have the ability and strength to lift and pour a gallon of boiling water at the risk of spilling some or scalding himself in making the coffee. Units of two, four, or more gallons are readily usable in the present invention and coffee is so readily prepared that the operator or restaurant keeper finds it no inconvenience to prepare a new batch of coffee at any time.

The invention will be more fully understood and its merits and advantages more completely appreciated by consideration of the specification set forth below when taken in connection with the drawings illustrating an embodiment thereof, in which Fig. 1 shows a coffee maker of the present invention with parts in fragmentary section;

Figure 2:
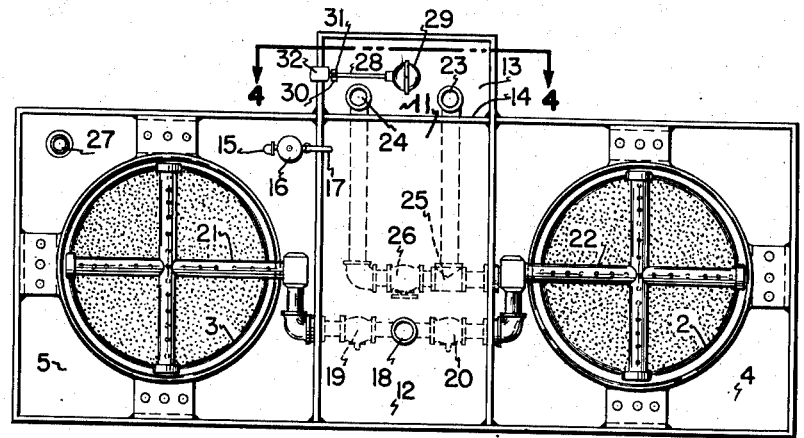
Fig. 2 shows a top view of the device of Fig. 1 with the covers to the coffee urns removed.
Figure 1:
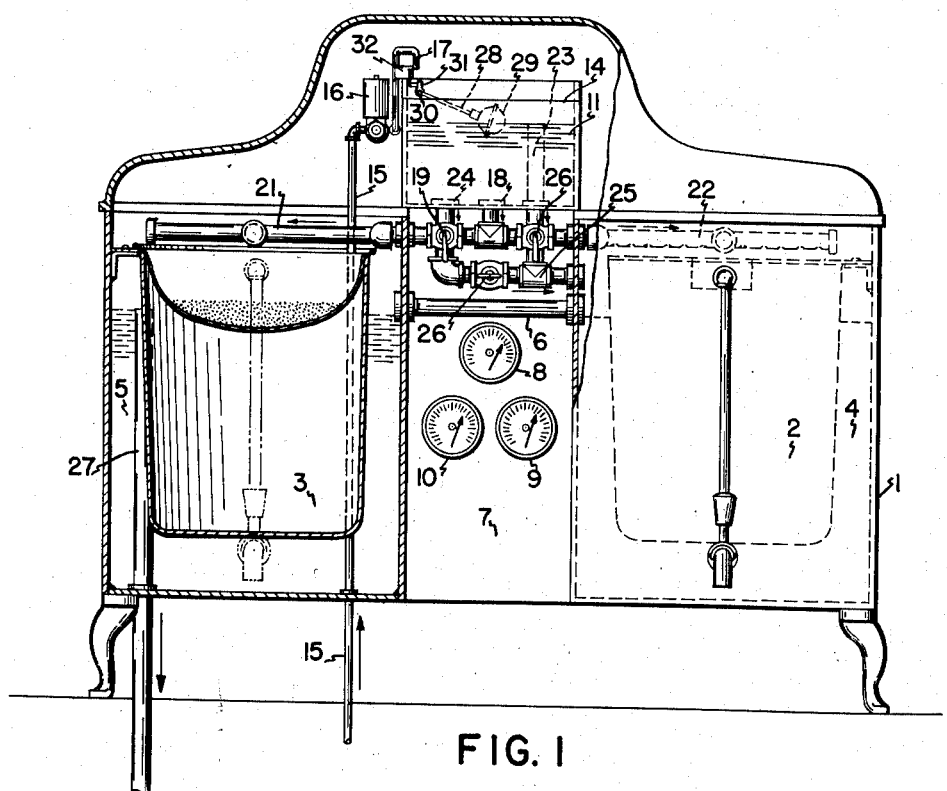

In the arrangement shown in Figs. 1 and 2, the complete coffee maker 1 has a pair of coffee containers or urns 2 and 3 between which instruments and valve operating mechanism may be contained for the operating unit in the preparation of the coffee. The containers 2 and 3, which may be of the usual fashion, are surrounded by conventional hot water jackets 4 and 5, which are preferably connected through a connecting pipe 6 extending from one jacket to the other. On the instrument panel 7 there may be placed three indicating thermometers 8, 9, and 10 for indicating respectively the temperature in each of the jackets and also of the water in the top vessel 11, respectively.

As shown more particularly in Figure 2, the top vessel 11 is divided into two compartments, the larger one 12 and the smaller one 13, separated by a partition or wall 14, which extends part way upward from the bottom of the tank and serves to provide, when filled to the top, a measured volume in the larger tank, since the water level in the tank 12 will rise to but no higher than the level of the upper edge of the partition 14. The compartment 13, as will be explained later, is used to control and initiate the operation of filling the compartment 12 to the desired volume. The compartment 12 is filled by the pipe line 15 which extends through a solenoid valve 16 and makes it possible to deposit boiling water from the outlet 17 just above or just within the tank section 12.

The section or chamber 12 is provided with an outlet 18, which is connected by a T joint to the manually operable valves 19 and 20, which in turn are connected respectively to the spray rings 21 and 22 pivoted over the top of the coffee containers 2 and 3 respectively. When once the chamber 12 has been filled with boiling water, it may be emptied either by the valve 19 or 20 to permit the rings 20 and 21 respectively to spray over the coffee in the bag at the top of the container.

The compartment 13 of the vessel 11 is provided with an overflow drain 23 and an outlet drain 24. The overflow drain is carried off through the T joint 25 into the jacket 4 and the drain 24 is carried off through the valve 26 into the jacket 4. Since the jackets 4 and 5 are connected, the overflow could be deposited in either jacket. The overflow pipe for the jackets 4 and 5 is shown in the jacket 5 at 27, which will automatically regulate the height of water in the jacket. In the compartment or section 13 there is a lever pivoted at 30 having a float arm 28 carrying a float ball 29 at one end 31 on one side of the pivot and at the other side of the pivot a short arm against an electric switch 32 of the type in which a small movement is sufficient to operate it, such as a "microswitch." The operation of the switch 32 takes place with the lowering of the ball 29 when the compartment 13 is drained. This operation of the switch 32 will cause the solenoid valve 16 to open, permitting the boiling water to enter through the pipe 15 and outlet 17 into the compartment 12.

Initially, in the operation of the system, the compartment 13 is filled up to a level such that the float 29 prevents the solenoid valve 16 from operating and depositing boiling water into the compartment 12. By opening the valve 26 the compartment 13 is drained into the jacket, dropping the float 29 and opening the valve 16 so that the compartment 12, which heretofore has been empty, may become filled with boiling water. Boiling water will continue to flow into the compartment 12 until it flows over the partition 14 sufficiently to raise the float 29 causing the switch 32 to operate to close the valve 16. When the valve 16 has closed, the water in the compartment 13 is still below the level of the partition 14 while water in the compartment 12 is just at the level of the edge of the partition so that a measured volume of water is contained in the vessel 12. Thereafter, either the valve 19 or 20 is opened permitting the water to flow either into the T sprays or pipes 21 or 22, respectively, over the coffee in the open bag hung in the top of the container. It may be noted that the valve 26, which may fly back when released, need only be held open until the solenoid 16 has operated and the water begins to flow, as in any event the tank 12 will fill to the level of the partition 14, whether the valve 26 is held open for a shorter or a longer period of time.

Figure 4:
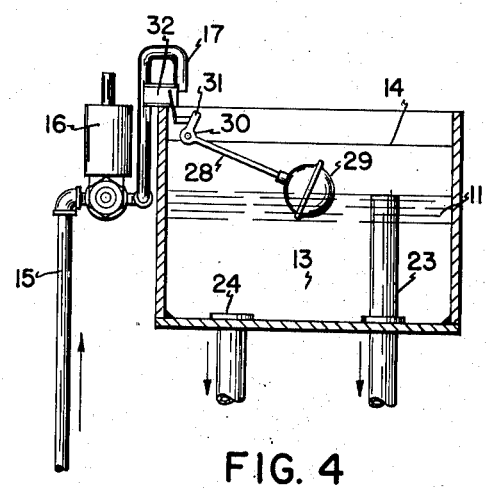
Fig. 4 shows an enlarged detail of the invention.

An enlarged detail of the section 13 of the tank is shown in Fig. 4. Action in the closing and opening of the switch 32 gives a sufficient differential to permit water to fill the compartment 12 to the level of the partition. The provision of the drain or exhaust of the water in section 13 into the surrounding jacket of the coffee container insures the keeping of the level in the jacket to the desired height. The flow of water into the compartment 12 is sufficiently rapid so that little change in temperature takes place, and this temperature of the water is always indicated by means of the indicator 8. In this arrangement, either unit 2 or 3 may be used and coffee may be made so rapidly that one unit may be practically exhausted before coffee is made in the other unit, without in any way interrupting service to the patrons.

Figure 3:
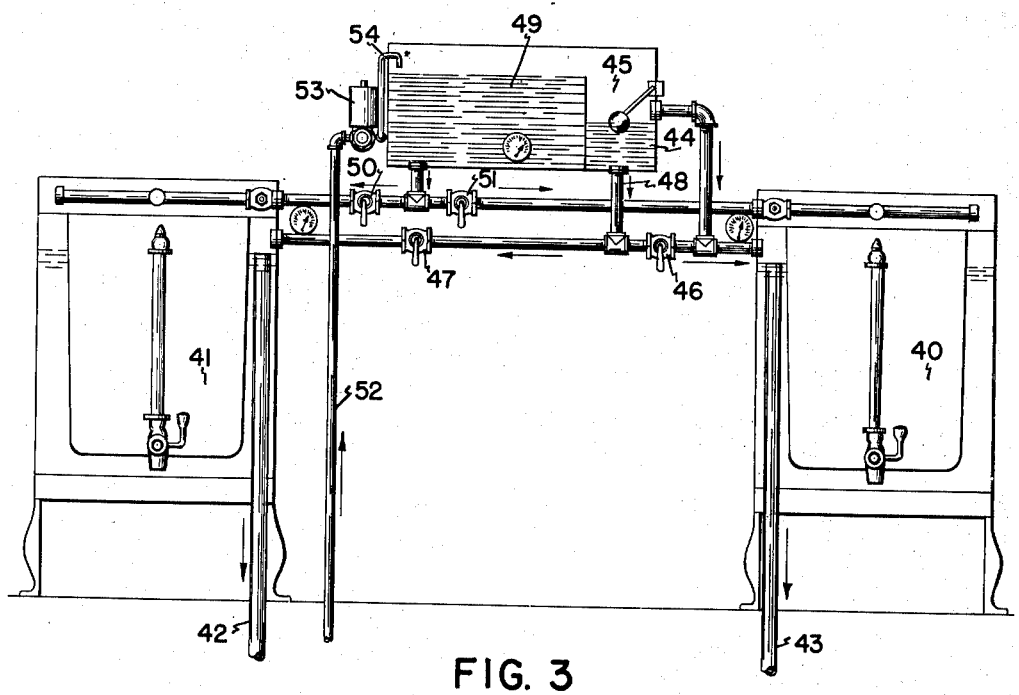
Fig. 3 shows a modification of the arrangement of Fig. 1.

While the arrangements shown in Figs. 1 and 2 show the coffee maker incorporated in a single united structure, the various elements may be positioned at a considerable distance one from the other. This is indicated in Fig. 3, where independent coffee urns or containers 40 and 41 may be used, connected substantially similarly as shown in Figs. 1 and 2, with perhaps the following exceptions:

In Fig. 3, independent overflow drains 42 and 43 are shown for the surrounding jackets of the coffee containers. The drain from the small compartment 44 of the measuring device or element 45 may be deposited either in the jacket 40 or 41 by suitable choice of operation of the valves 46 and 47 connected by a T joint or outlet 48 from the chamber 44. The main measuring compartment 49 may be drained into either coffee container by operation of either the selector valve 50 or the selector valve 51. The inlet for the hot water is similarly shown as in Figs. 1 and 2, through the inlet pipe 52, solenoid valve 53, and inlet opening 54.

The operation of the system shown in Fig. 3 is parallel and similar to that previously explained in Fig. 1. Using the apparatus as described above, any counter operator in the usual type of restaurant is capable of making coffee at any time by following the simple rule of depositing the proper amount of coffee in the coffee bag, starting the operation of the system by opening the valve, draining the small compartment until the boiling water starts to flow in the larger compartment, when the drain valve for the small compartment is again closed and the operator waits until the solenoid valve has shut off. He then knows that the proper amount of water is available and opens either one valve or the other to permit the water to sprinkle or spray over the coffee. There is no need in the present system of pouring the brew back over the coffee grounds, as uniform spraying with definite line and pipe connections permits the coffee to be made as desired without such repouring.

Having now described my invention, I claim:

1. A coffee maker of the type described, comprising a tank adapted to contain a measured quantity of substantially boiling water, means partitioning off a portion of said tank, said partition being substantially less than the depth of the tank, whereby water may flow over the partition being substantially less than the depth manual control means for emptying the water from the partitioned off portion, control means positioned in said positioned off section operated in accordance with the level of the water in said partitioned off section, means controlled by said control means for providing a flow of boiling water to said tank and for shutting off the supply of the same, said control means shutting off the flow of boiling water to said tank when the over-flow over said partition to the partitioned off section reaches a predetermined level and admitting the flow of boiling water to said tank when the level in the partitioned off section has been depressed below a predetermined level and manual control means for permitting the flow of water from said partitioned off section.

2. A coffee maker of the type described comprising a tank adapted to contain a measured quantity of boiling water, a supply line for the boiling water to said tank, a second tank with connections to said first tank for receiving an overflow thereof beyond the measured volume, a float operated switch in said second tank, valve means operably controlled by said float operated switch when the level of water in said second tank has reached a predetermined level for shutting off the supply of water to the first tank and when the level of water in said second tank has dropped from said predetermined level for admitting said boiling water to said first tank, means for dropping the water level in said second tank, a coffee percolator positioned below the level of the bottom of the first tank, having pipe connections therewith and valve means operable for admitting water from the tank containing the measured quantity of boiling water to said coffee percolator.

3. A coffee maker of the type described comprising a unitary structure having a pair of coffee percolators therein and a tank positioned between the percolators with the bottom thereof at a level higher than the percolators, a shower spray positioned over each of the percolators for wetting the coffee grounds at the top thereof, and pipe means connecting said sprays with said tank through selector valves, said tank having an overflow level positioned to permit a measured quantity of water to be contained therein, a second tank having a float operated switch, the water to said second tank being supplied by the over-flow from the first tank, an exhaust outlet from the second tank having a manual control, valve means operably controlled by said float operated switch when the level in the second tank is depressed by opening said exhaust outlet for admitting boiling water to said first tank and for shutting off the supply of said boiling water when the overflow of the first tank to the second tank has raised said float to a predetermined position.

4. A coffee maker of the type described comprising a unitary structure having a pair of coffee percolators therein and a tank positioned between the percolators with the bottom thereof at a level higher than the percolators, a shower spray positioned over each of the percolators for wetting the coffee grounds at the top thereof, and pipe means connecting said sprays with said tank through selector valves, said tank having an overflow level positioned to permit a measured quantity of water to be contained therein, a second tank having a float operated switch, the water from said second tank being supplied by the overflow from the first tank, an exhaust for the second tank having a manual control, valve means operably controlled by said float operated switch when the level in the second tank is depressed by opening said exhaust for admitting boiling water to the first tank and for shutting off the supply of said boiling water when the overflow of the first tank to the second tank has raised said float to a predetermined position, said percolators having surrounding water jackets and means connecting the exhaust from said second tank to said water jackets whereby periodically a small quantity of water will be supplied thereto in causing the filling of said first tank when the exhaust of said second tank is opened to depress said float from its predetermined position.

NATHAN SHARAF.

REFERENCES CITED

The following references are of record in the file of this patent:

UNITED STATES PATENTS

| Number | Name | Date |
|---|---|---|
| 855,702 | Goddard | June 4, 1907 |
| 1,457,037 | Kreutz | May 29, 1923 |
| 1,472,551 | Capocci | Oct. 30, 1923 |
| 1,551,855 | Svendsgaard | Sept. 1, 1925 |
| 1,603,130 | McDuffie | Oct. 12, 1926 |
| 1,630,904 | Reckard | Mar. 31, 1927 |
| 1,869,720 | Strand et al. | Aug. 2, 1932 |
| 2,016,281 | Harper et al. | Oct. 8, 1935 |
| 2,086,127 | Gordon et al. | July 6, 1937 |
| 2,206,424 | Oyan | July 2, 1940 |
| 2,247,226 | Ehrenreich | June 24, 1941 |

FOREIGN PATENTS

| Number | Country | Date |
|---|---|---|
| 4,501 | Great Britain | of 1878 |
| 24,403 | Australia | July 21, 1930 |
| 471,080 | France | July 1, 1914 |